(12) United States Patent
Hendrix et al.

(10) Patent No.: US 6,850,366 B2
(45) Date of Patent: Feb. 1, 2005

(54) MULTI-CAVITY OPTICAL FILTER

(75) Inventors: Karen Denise Hendrix, Santa Rosa, CA (US); Charles Andrew Hulse, Sebastopol, CA (US); Frederik Kevin Zernik, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 95 days.

(21) Appl. No.: 10/267,421

(22) Filed: Oct. 9, 2002

(65) Prior Publication Data

US 2004/0070834 A1 Apr. 15, 2004

(51) Int. Cl.[7] .............................................. G02B 5/28
(52) U.S. Cl. .................. 359/589; 359/587; 359/588; 359/578; 359/584
(58) Field of Search ............................. 359/577, 578, 359/584, 587, 589, 585, 588, 590; 428/916

(56) References Cited

U.S. PATENT DOCUMENTS

| | | | |
|---|---|---|---|
| 5,719,989 A | 2/1998 | Cushing | 359/589 |
| 5,926,317 A | 7/1999 | Cushing | 359/588 |
| 5,999,322 A | 12/1999 | Cushing | 359/589 |
| 6,011,652 A | 1/2000 | Cushing | 359/588 |
| 6,018,421 A | 1/2000 | Cushing | 359/589 |
| 6,081,379 A | 6/2000 | Austin et al. | 359/584 |
| 6,154,318 A | 11/2000 | Austin et al. | 359/584 |
| 6,256,434 B1 | 7/2001 | Matuschek et al. | 385/37 |
| 6,278,817 B1 | 8/2001 | Dong | 385/37 |
| 6,301,049 B1 | 10/2001 | Kärtner et al. | 359/588 |

FOREIGN PATENT DOCUMENTS

| | | | |
|---|---|---|---|
| DE | 44 42 045 A1 | 5/1996 | G02B/5/28 |
| GB | 2 352 050 A | 1/2001 | G02B/5/28 |
| WO | WO 00/45201 | 8/2000 | G02B/5/28 |

*Primary Examiner*—Fayez Assaf
(74) *Attorney, Agent, or Firm*—Allen, Dyer, Doppelt, Milbrath & Gilchrist, P.A.

(57) ABSTRACT

The invention provides a multi-cavity filter, and in particular, a multi-cavity bandpass filter having a predetermined centre wavelength. The filter includes a plurality of cavities, each cavity including two partially reflecting films separated by a layer of dielectric material. The two partially reflecting layers are formed from layers of material having alternating high and low refractive indices. Each layer of dielectric material has a thickness that is an integral number of half-waves of the centre wavelength. The filter has an asymmetric structure that causes the reflected chromatic dispersion from one side of the filter to be reduced relative to the reflected chromatic dispersion from the other side.

15 Claims, 8 Drawing Sheets

| SYMMETRIC 6-CAVITY BANDPASS | | ASYMMETRIC 6-CAVITY BANDPASS | |
|---|---|---|---|
| R1 | 0.989950577665447 | R1 | 0.988092439612876 |
| R2 | 0.999986483131075 | R2 | 0.999982293921679 |
| R3 | 0.999994121274529 | R3 | 0.999993182073070 |
| R4 | 0.999994878974983 | R4 | 0.999994878974983 |
| R5 = R3 | 0.999994121274529 | R5 | 0.999994878974983 |
| R6 = R2 | 0.999986483131075 | R6 | 0.999989344093889 |
| R7 = R1 | 0.989950577665447 | R7 | 0.991343966133528 |

MULTI-CAVITY OPTICAL FILTER

CROSS-REFERENCE TO RELATED APPLICATIONS

Not Applicable

MICROFICHE APPENDIX

Not Applicable

FIELD OF THE INVENTION

This invention relates generally to the field of multi-cavity optical filters, and in particular to multi-cavity optical filters having low reflected chromatic dispersion.

BACKGROUND OF THE INVENTION

Optical interference, that modifies the transmitted and reflected intensities of light, occurs with the superposition of two or more beams of light. The principle of superposition states that the resultant amplitude is the sum of the amplitudes of the individual beams. The brilliant colors, for example, which may be seen when light is reflected from a soap bubble or from a thin layer of oil floating on water are produced by interference effects between two trains of light waves. The light waves are reflected at opposite surfaces of the thin film of soap solution or oil.

More importantly, a practical application for interference effects in thin films involves the production of coated optical surfaces. When a film of a transparent substance is deposited on transparent substrate such as glass, for example, with a refractive index which is properly specified relative to the refractive index of the glass and with a thickness which is one quarter of a particular wavelength of light in the film, the reflection of that wavelength of light from the glass surface can be almost completely suppressed. The light which would otherwise be reflected is not absorbed by a non-reflecting film; rather, the energy in the incident light is redistributed so that a decrease in reflection is accompanied by a concomitant increase in the intensity of the light which is transmitted.

Considerable improvements have been achieved in the anti-reflective performance of such films by using a composite film having two or more superimposed layers. Two different materials may be used in fabricating such a composite film, one with a relatively high index of refraction and the other with a relatively low index of refraction. The two materials are alternately deposited to predetermined thicknesses to obtain desired optical characteristics for the film. In theory, it is possible with this approach to design multi-layer interference coatings for a great variety of transmission and reflection spectra. This has led to the development of many new optical devices making use of complex spectral filter structures. Anti-reflection coatings, laser dielectric mirrors, television camera edge filters, optical bandpass filters, and band rejection filters are some of the examples of useful devices employing thin film interference coatings.

One particular type of interference coating is the optical bandpass filter, which is designed to allow wavelengths within a predetermined range (i.e., the desired pass-band) to be transmitted, while a range of wavelengths on either side of the pass band are highly reflected. Ideally a bandpass filter should have a square spectral response. In other words, the transition from the rejection regions to the passband should be as rapid as possible, or expressed differently, the slope of transition region should be as steep as possible, while obtaining a pass band region that is uniform and has little or no ripple.

Figure 1:
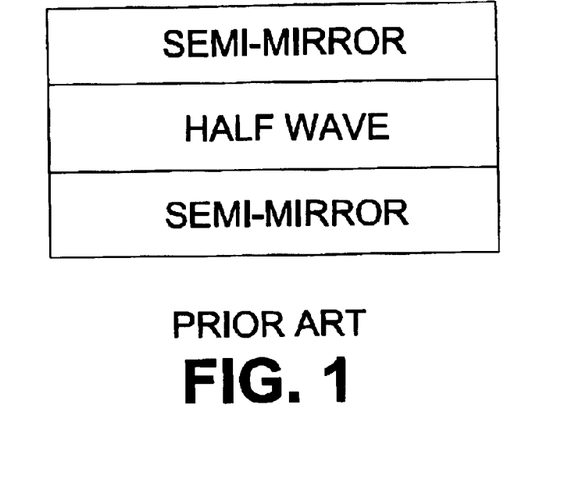
FIG. 1 is a schematic diagram of a prior art solid etalon filter.

The simplest bandpass filter, shown in prior art FIG. 1, consists of two partial-reflectors or semi-mirrors separated by a half wave layer of transparent dielectric material (e.g., glass or air).

Figure 2:
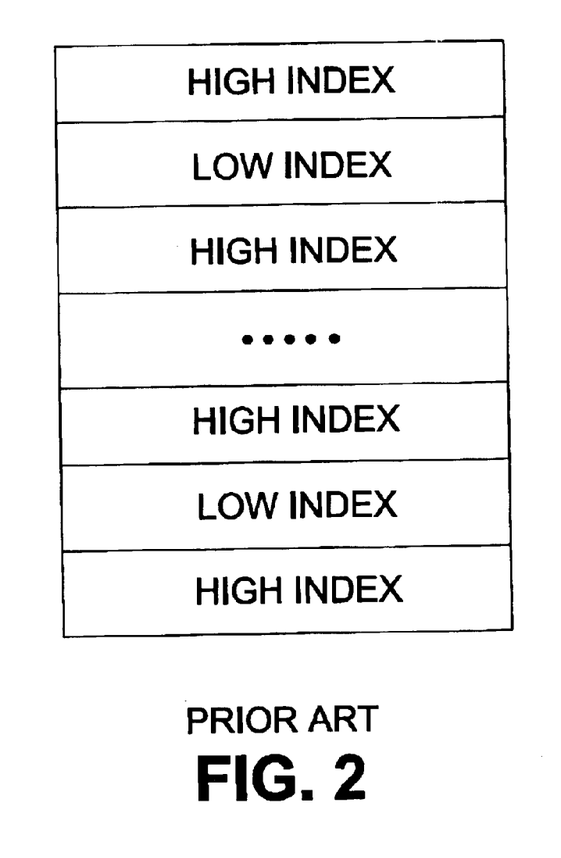
FIG. 2 is a schematic diagram of a prior art quarter wave stack.

Turning now to FIG. 2, for all-dielectric filters, the partial-reflector shown consists of alternating layers of high and low index materials. Each layer is deposited as a quarter-wave (QW) thickness at the wavelength of the desired filter. Each partial-reflector, which may be comprised of only a single layer, is called a quarter-wave stack (QWS). The bandwidth of the filter is a function of the reflectance of quarter-wave stacks in the structure. The centre wavelength of the pass-band is determined by the thickness of the spacer dielectric material.

Figure 3:
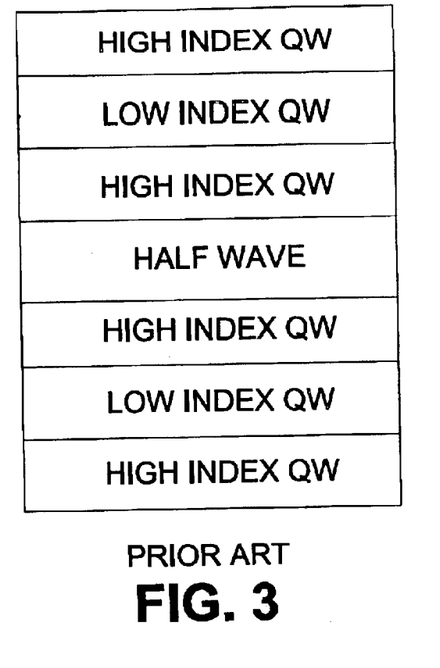
FIG. 3 is a schematic diagram of a prior art filter cavity with a dielectric half wave spacer.

Referring now to FIG. 3, a filter cavity, the basic building block for all-dielectric interference filters, is shown. The cavity is comprised of two reflectors made from quarter-wave stacks separated by a half wave (or multiple halfwave) dielectric layer. Notably, the cavity essentially functions as an etalon or a Fabry-Perot filter.

Cavities are deposited on top of other cavities, with a quarter-wave layer of low index material between, to sharpen the slopes of the transmission response. This produces a multi-cavity filter as shown in FIG. 4.

Typically, the cavities are deposited on a substrate that is transparent over the wavelength of interest and, may be made from a wide variety of materials including (but not limited to), glass, quartz, clear plastic, silicon, and germanium. Usually, the dielectric materials used for the quarter and half-wave layers have indices of refraction in the range 1.3 to beyond 4.0. For example, some suitable materials are: Magnesium Fluoride (1.38), Thorium Fluoride (1.47), Cryolite (1.35), Silicon Dioxide (1.46), Aluminum Oxide (1.63), Hafnium Oxide (1.85), Tantalum Pentoxide (2.05), Niobium Oxide (2.19), Zinc Sulphide (2.27), Titanium Oxide (2.37), Silicon (3.5), Germanium (4.0), and Lead Telluride (5.0). Of course, other dielectric materials would serve as well.

Design of the filter is easily accomplished with the aid of commercially available computer programs with optimization routines (i.e. TFCalc.™ by Software Spectra Inc.). In particular, the design is entered into the program and the spectral response is calculated. When the design with the appropriate cavity size is selected to match the required nominal bandwidth, optimization of the filter transmission is performed for the matching layers. The designer selects from a choice of materials to use in a quarter wave match or may choose to use the same low index material with thickness adjustments to accomplish the matching.

Figure 4:
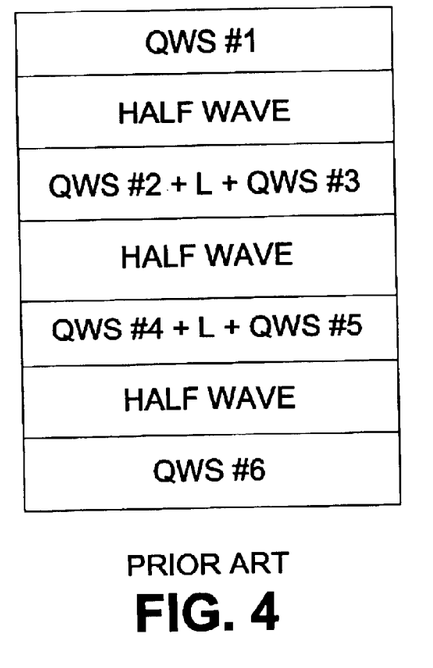
FIG. 4 is a schematic diagram of a prior art multi-cavity filter.

There have been various attempts to improve the spectral performance of the multi-cavity filter shown in FIG. 4. In particular, there has been significant emphasis on improving transmission, producing a square band shape, and reducing ripple. For example, U.S. Pat. Nos. 5,719,989, 5,926,317, 5,999,322, 6,011,652 and 6,018,421 to Cushing, incorporated herein by reference, disclose varying the number of cavities, varying the number of layers in the outer cavity stacks, adding half wave to inter cavity stacks, and/or adding multiple half wave to the outer cavity stacks. In each of these references the cavities and/or modified cavities are symmetrically arranged about the centre of the filter.

What has not been addressed in the field of multi-cavity filters is chromatic dispersion. U.S. Pat. Nos. 6,081,379, 6,256,434, 6,081,379 and 6,154,318, incorporated herein by reference, discuss the problems associated with chromatic dispersion and teach optical devices having reducing dispersion. However, none of these teachings are applicable to multi-cavity filters. U.S. Pat. No. 6,278,817 to Dong teaches a Bragg grating filter designed such that reflected dispersion at one end of the grating element is decreased at the expense of increased dispersion at the other end of the grating. This is accomplished by providing the periodic variations in refractive index with a spatially asymmetric index of modulation. However, since multi-cavity filters operate differently and have a different structure from fibre Bragg gratings, these teachings do not provide a solution to lowering the dispersion in multi-cavity filters.

It is an object of the instant invention to provide a low reflected dispersion multi-cavity filter.

SUMMARY OF THE INVENTION

The instant invention provides a multi-cavity filter, for example a bandpass filter or an interleaver, that is asymmetric in structure. Notably, the structural asymmetry is predetermined such that the reflected chromatic dispersion is substantially different from either side of the filter and such that this difference is exploitable. For example, by designing a sufficiently large difference in reflected chromatic dispersion, one side of the filter will exhibit a reflected chromatic dispersion that is significantly lower than that which is observed for a filter having a symmetric structure.

In accordance with the invention there is provided a multi-cavity optical filter comprising: a first end; a second end opposing the first end; and a plurality of filter cavities disposed between the first and second ends, each filter cavity including two spaced apart partially reflective films, wherein the plurality of cavities are asymmetrically arranged about a physical centre of the filter such that chromatic dispersion for light reflected from the first end is different from chromatic dispersion for light reflected from the second end.

For example, in one embodiment the asymmetry is provided by arranging the plurality of cavities such that the strongest reflector (i.e., the most reflective partially reflective film) in the filter is away from the physical centre of the filter. In another embodiment, the asymmetry is introduced by using multiple half-wave spacers in which the multiples are asymmetrically arranged about the physical centre of the filter.

In accordance with the instant invention there is provided a multi-cavity optical filter comprising: a plurality of filter cavities, each cavity including two spaced apart partially reflective films and having a specific Q factor, wherein the plurality of cavities are disposed about a centre of the filter, and wherein at least one cavity has a Q factor different than an opposing cavity, the at least one cavity and the opposing cavity each substantially a same distance from the centre of the filter.

In accordance with the instant invention there is provided a multi-cavity optical filter for passing an optical band of wavelengths having a predetermined centre wavelength, comprising: two outer filter cavities; and a plurality of inner filter cavities disposed between the two outer cavities, each of the inner and outer cavities including a dielectric reflector stack having layers with alternating high and low refractive indices, said reflector stacks being separated by a layer of dielectric material having a thickness that is an integral number of half-waves of the centre wavelength, said plurality of inner cavities disposed in pairs about a physical centre of the filter such that there is an equal number of cavities on either side thereof, wherein at least one pair comprises dissimilar cavities.

In accordance with the instant invention there is provided a multi-cavity optical filter comprising: a first outer partially transmissive reflector; a second outer partially transmissive reflector spaced apart from the first reflector; and a plurality of inner partially transmissive reflectors disposed between the first and second outer reflectors, each reflector separated from another by a predetermined distance, wherein the partially transmissive reflectors comprise multi-layer interference films, and wherein the plurality of inner reflectors are arranged such chromatic dispersion of light reflected from the first outer reflector is different than chromatic dispersion of light reflected from the second outer reflector.

BRIEF DESCRIPTION OF THE DRAWINGS

Exemplary embodiments of the invention will now be described in conjunction with the drawings in which.

DETAILED DESCRIPTION OF THE INVENTION

The instant invention provides a multi-cavity filter having low reflected dispersion. In particular, the multi-cavity filter is designed to be asymmetric in structure such that the chromatic dispersion for light reflected from one side of the filter is lower than the chromatic dispersion for light reflected from the other side of the filter.

Figure 5:
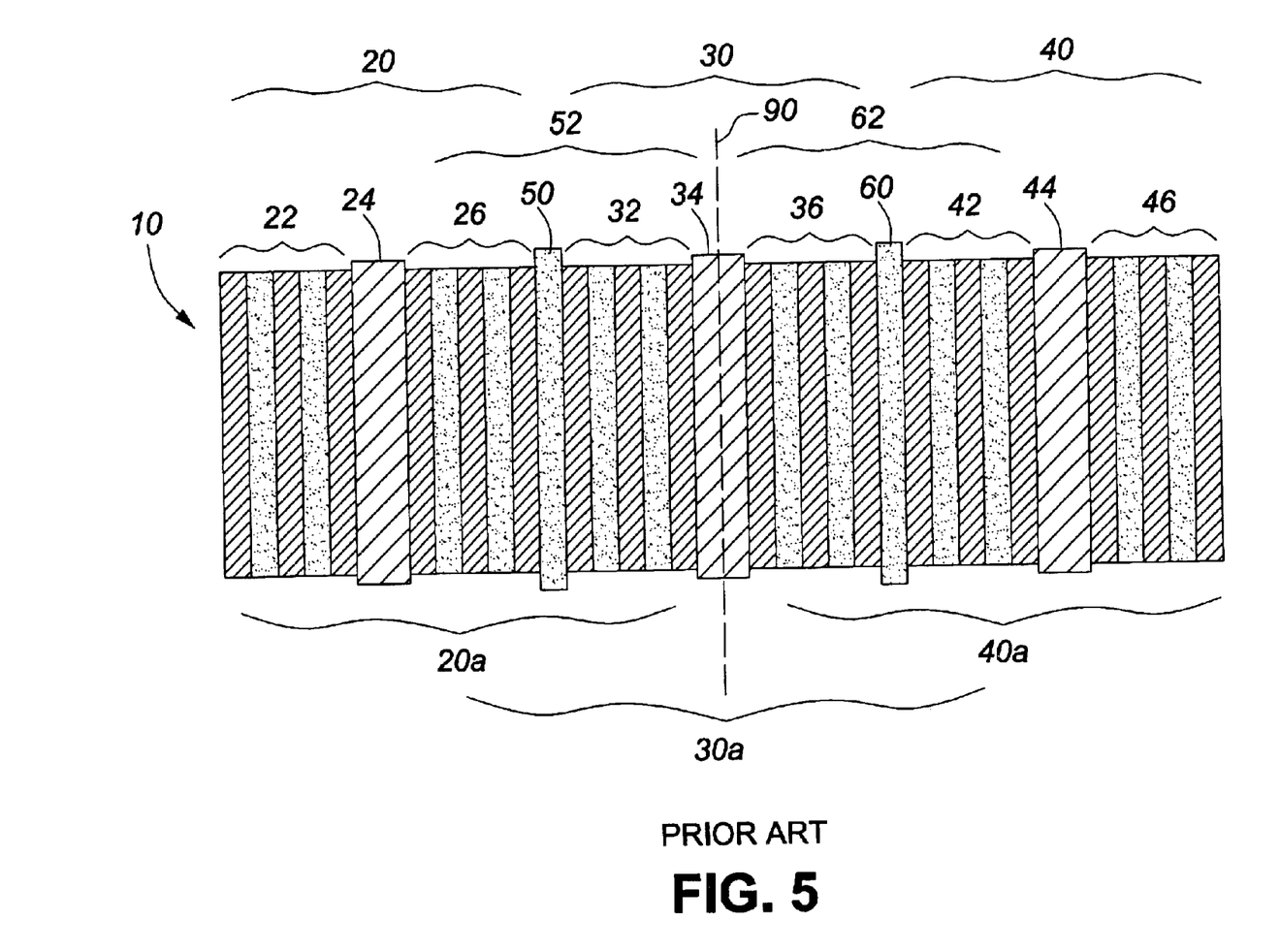
FIG. 5 is a schematic diagram of a prior art three-cavity filter wherein the inner reflectors are stronger and are symmetrically disposed about a centre of the filter.

Referring to FIG. 5, there is shown a prior art three-cavity bandpass filter for passing a narrow band of wavelengths having a centre wavelength $\lambda_m$ and for reflecting all other wavelengths. The filter 10 includes a first outer cavity 20, an inner core cavity 30, and a second outer cavity 40. With reference to the first outer cavity 20, each cavity 20, 30, 40, includes a dielectric spacer 24 having a thickness that is a half-wave, or multiple half-wave, with respect to the centre wavelength. On either side of the spacer 24 are reflecting layers 22, 26 made from quarter-wave stacks of alternating layers of high and low index materials. The cavities 20, 30, 40 are arranged in tandem about plane 90, which corresponds approximately to the physical or geometric centre of the filter. In other words, plane 90 bisects the filter such that there is an equal number of filter cavities on either side thereof. Preferably, the quarter-wave stacks and dielectric spacers are constructed from materials known to those skilled in the art, as for example, discussed heretofore.

Each cavity 20, 30, 40 is shown separated from another by a quarter-wave layer of low index material, 50, 60, such that together reflecting layers 26 and 32 form a single quarter-wave stack 52, and reflecting layers 36 and 42 form a single quarter-wave stack 62. Accordingly, the first outer cavity is optionally defined as being at 20a, the inner cavity at 30a, and the second outer cavity at 40a. In general, the increased number of layers in quarter-wave stacks 52 and 62 relative to 22 and 46 is associated with a higher reflectivity. Alternatively, a higher reflectivity is achieved by changing the index ratio between the high and low layers. The strengthening of reflectors or the increasing of spacer thickness by a predetermined number of half-waves (i.e., increasing the cavity order) narrows the passband width. The addition of more cavities makes the filter have a shaper transition from transmission to reflection. In general, conventional bandpass filter designs are similar to that shown in FIG. 5, where the bandpass filter is a multi-cavity filter having its strongest reflectors arranged about a physical centre of the filter and with the other reflectors becoming progressively weaker towards either end. Notably, this arrangement of reflectors is symmetric about the centre of the filter. Even with some small asymmetry in the outer reflectors (e.g., 22, 46) to accommodate differing ambient and substrate materials, this provides a filter with a reflected chromatic dispersion that is substantially the same from either side of the filter.

Figure 6:
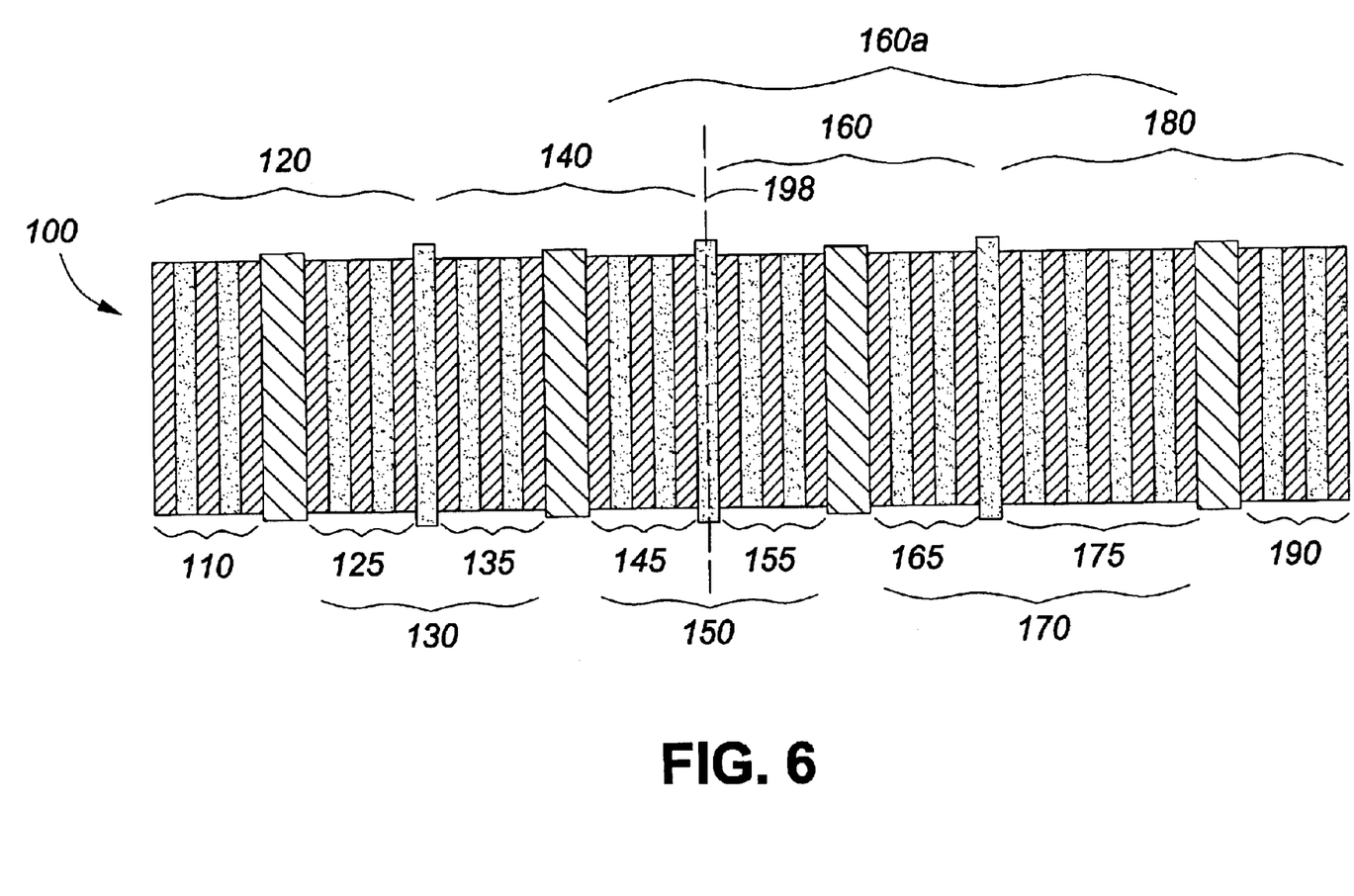
FIG. 6 is a schematic diagram of a multi-cavity filter in accordance with an embodiment of the instant invention.

Referring to FIG. 6, there is shown an optical bandpass filter in accordance with an embodiment of the instant invention. The filter 100 passes a narrow band of wavelengths having a centre wavelength $\lambda_n$ and reflects all other wavelengths. The filter 100 includes a first outer cavity 120 having partially reflective layers 110 and 125, a first inner core cavity 140 having partially reflective layers 135 and 145, a second inner cavity 160 having partially reflective layers 155 and 165, and a second outer cavity 180 having partially reflective layers 175 and 190. Preferably, each partially reflective layer 110, 125, 135, 145, 155, 165, and 175, and 190 has a predetermined reflectivity and is made from quarter-wave stacks of alternating layers of high and low index materials, as discussed heretofore. Each cavity is shown separated from another by a quarter-wave layer of low index material, such that such that together reflecting layers 125 and 135 form a single quarter-wave stack 130, reflection layers 145 and 155 form a single quarter wave stack 140, and reflecting layers 165 and 175 form a single quarter-wave stack 170. Each cavity 120, 140, 160, and 180 has a cavity spacing provided by a dielectric spacer having a thickness that is a half-wave, or multiple half-wave, with respect to the centre wavelength $\lambda_n$. The cavities 120, 140, 160, and 180 are arranged in tandem about plane 198, which corresponds approximately to the physical or geometric centre of the filter. In other words, plane 198 bisects the filter such that there is an equal number of filter cavities and/or spacers on either side thereof. The reflectivity of reflective layer 175 is greater than the reflectivity of any other of the reflective layers 110, 125, 135, 145, 155, 165, and 190, and in particular is not equal to the reflectivity of reflective layer 125. In other words, the reflectivities of reflectors 130, 150, and 170 are asymmetrically distributed with respect to the centre of the filter (i.e., with respect to plane 198). Accordingly, the filter structure is asymmetric.

Figure 7:
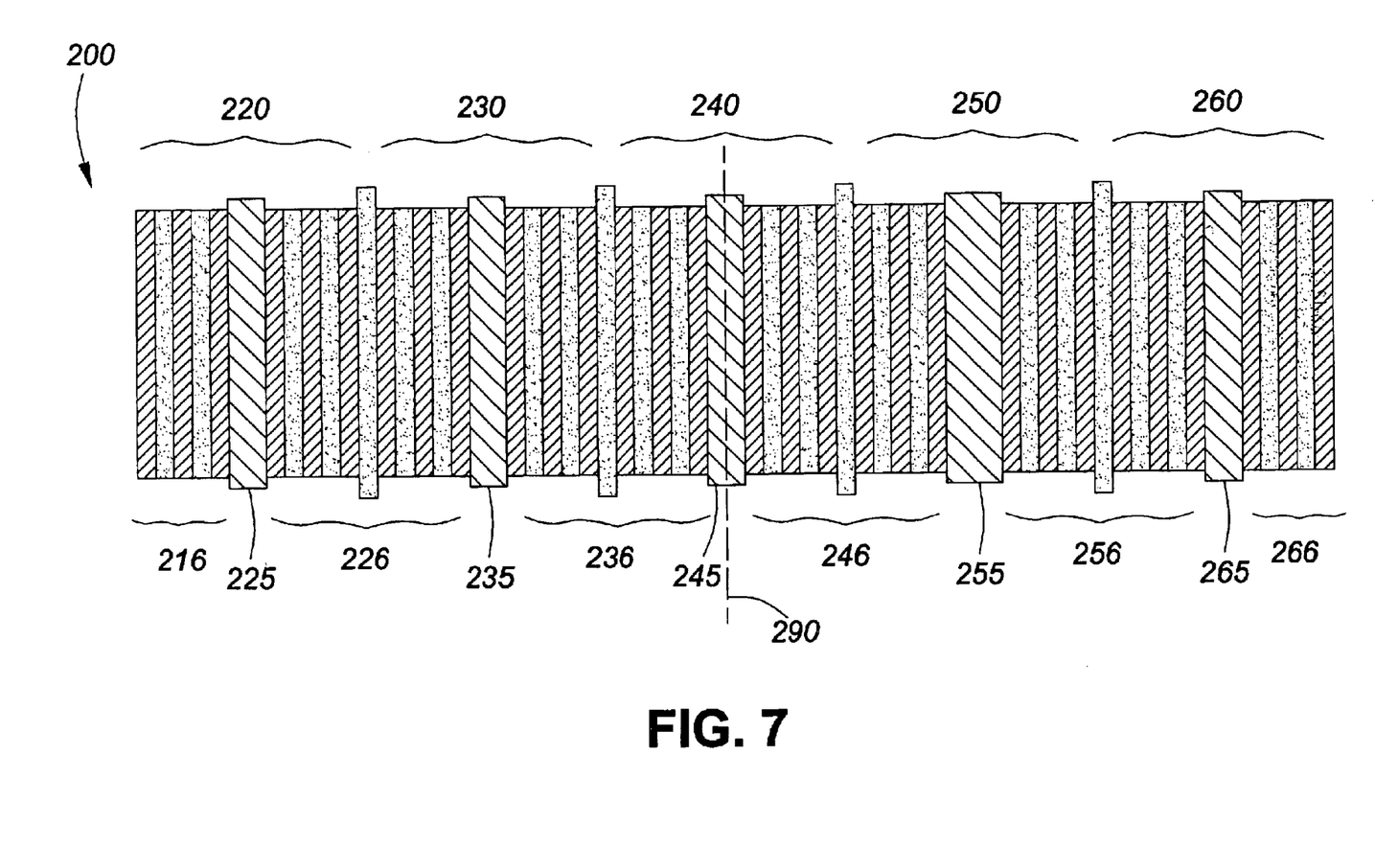
FIG. 7 is a schematic diagram of a multi-cavity filter in accordance with another embodiment of the instant invention.

Referring to FIG. 7, there is shown an optical bandpass filter in accordance with another embodiment of the instant invention. The filter 200 passes a narrow band of wavelengths having a centre wavelength $\lambda_p$ and reflects all other wavelengths. The filter 200 includes a first outer cavity 220, a first inner core cavity 230, a second inner core cavity 240, a third inner core cavity 250, and a second outer cavity 260. Preferably, each partially reflective layer 216, 226, 236, 246, 256, and 266 has a predetermined reflectivity and is made from quarter-wave stacks of alternating layers of high and low index materials, as discussed heretofore. In a preferred embodiment, the reflective layers 226, 236, 246, and 256 have a same reflectivity. In another embodiment, the reflectivities are different from one another. Each cavity 220, 230, 240, 250, and 260 has a cavity spacing provided by a dielectric spacer 225, 235, 245, 255, 265, respectively. Preferably, each spacer has a thickness that is a half-wave, or multiple half-wave, with respect to the centre wavelength $\lambda_p$. The cavities 220, 230, 240, 250, and 260 are arranged in tandem about plane 290, which corresponds approximately to the physical or geometric centre of the filter. In other words, plane 290 bisects the filter such that there is an equal number of filter cavities disposed along the transmission axis of the filter on either side of the plane 290. In this embodiment, the spacers 225, 235, 245, and 265 are shown having a half-wave thickness, while spacer 255 is shown having a full wave thickness. Since the cavity 250 having the full wave spacer 255 is disposed other than at the centre of the filter 290, asymmetry is introduced into the filter structure.

The asymmetry of filters 100 and 200, shown in FIGS. 6 and 7, respectively, has been discussed with respect to the reflectivity of the reflective layers and the cavity spacing, respectively. Alternatively, the asymmetry is discussed with respect to the Quality factor, or Q factor, of the cavities. The Q factor of an optical cavity is a measure of the ability of that cavity to store electromagnetic energy between the reflective surfaces of an etalon (i.e., in this case a measure of the ability to store energy within a cavity). For example, when both reflective layers within a cavity have a high reflectivity, energy is stored well within the cavity and the Q factor has a high value. When at least one of the reflective layers has a low reflectivity, the energy will escape through the reflective layer, and the Q factor will have a low value. Of course, other parameters, such as the cavity spacing, will also affect the Q factor of the cavity.

Referring again to FIG. 5, the inner cavity 30a has a higher Q factor than the outer cavities 20a and 40a, and the Q factors are symmetrically distributed about the centre 90 of the filter 10. In contrast, in the filter 100 shown in FIG. 6 the outer cavity 180 has a Q factor higher than cavities 120, 140, and 160. Viewed another way, the inner cavity 160a has the highest Q factor. In either case, the cavity with the highest Q factor is asymmetrically disposed about the centre of the filter. With respect to FIG. 7, the symmetrically arranged outer cavities 220 and 260 have a same Q factor, while the Q factors of the inner cavities are asymmetrically distributed about the centre of the filter 200.

Optionally, each of the above filters is designed by imposing a known asymmetry in the design and optimizing by hand or computer the remaining variables to produce a target spectral response and/or performance, while simultaneously minimizing the reflected chromatic dispersion from one side of the filter. For example, it may be desirable to produce a spectral response that mimics the spectral response of a symmetric multi-cavity filter.

Figure 8:
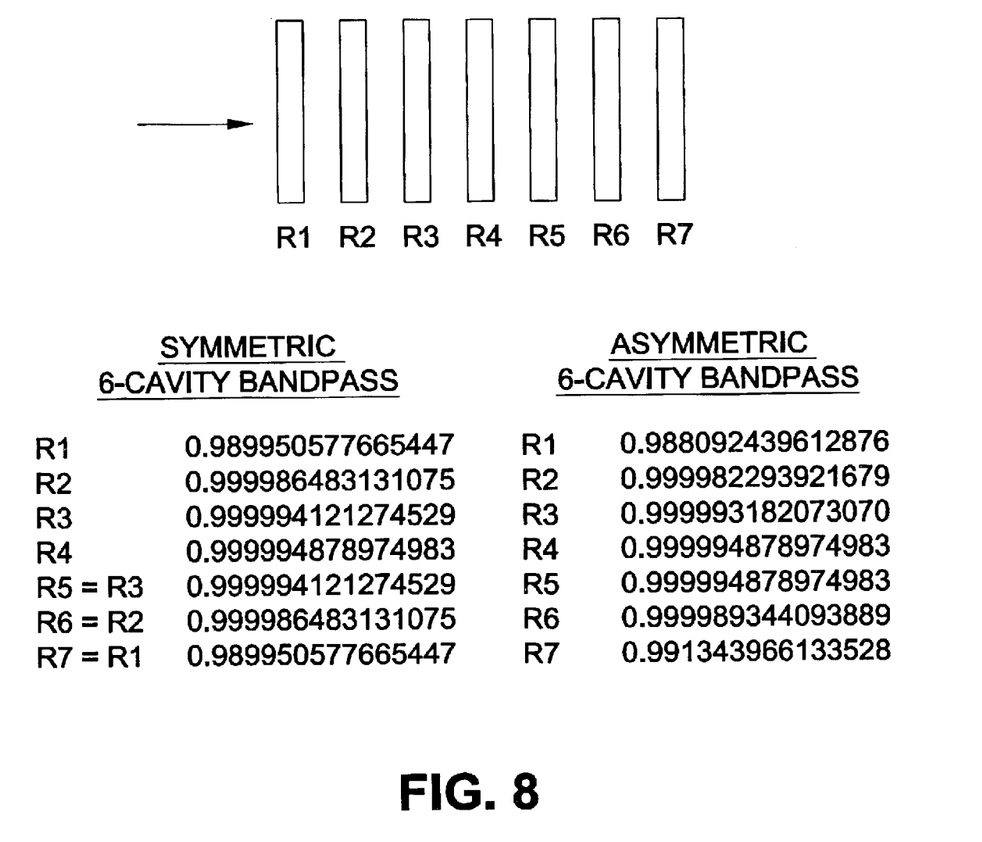
FIG. 8 is schematic diagram showing the reflectivities of a 6-cavity filter in accordance with an embodiment of the invention.

Referring to FIG. 8, there is shown a schematic diagram of a 6-cavity bandpass in accordance with an embodiment of the invention. The filter, which is for passing a band of wavelengths having a centre wavelength of about 1500 nm and reflecting all others, is shown having light incident thereon from the left hand side. The filter has seven reflectors, or reflecting layers, with reflectivities R1, R2, R3, R4, R5, R6, and R7, respectively. Preferably, each reflector is made from quarter-wave stacks of alternating layers of high and low index materials, as discussed heretofore. Each cavity has a cavity spacing corresponding to five half-waves (i.e., each cavity is $5^{th}$ order with respect to the centre wavelength). For simplicity, the dielectric spacers that provide the cavity spacing are not shown.

Figure 9A:
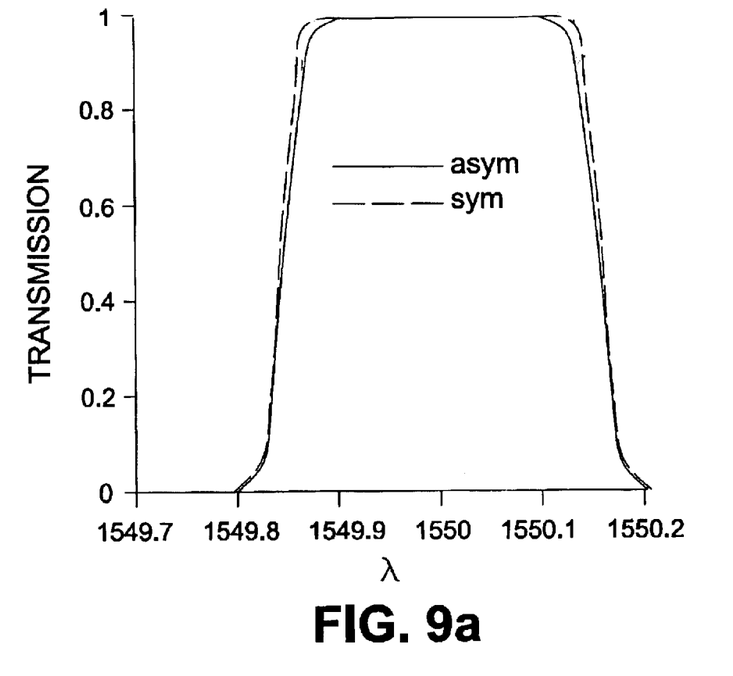
FIG. 9a illustrates the transmission spectrum of the filter shown in FIG. 8.

FIG. 9a illustrates the transmission spectra of the symmetric and asymmetric filters depicted in FIG. 8. When the reflectivities are symmetrically arranged in pairs about a centre of the filter as shown in the table on the left-hand side of FIG. 8, the spectral response is shown by the dotted line. When the reflectivities are asymmetrically distributed about the centre of the filter as shown in the table on the right-hand side of FIG. 8, the spectral response is shown with a solid line. Notably, these spectral responses are very similar.

Figure 9B:
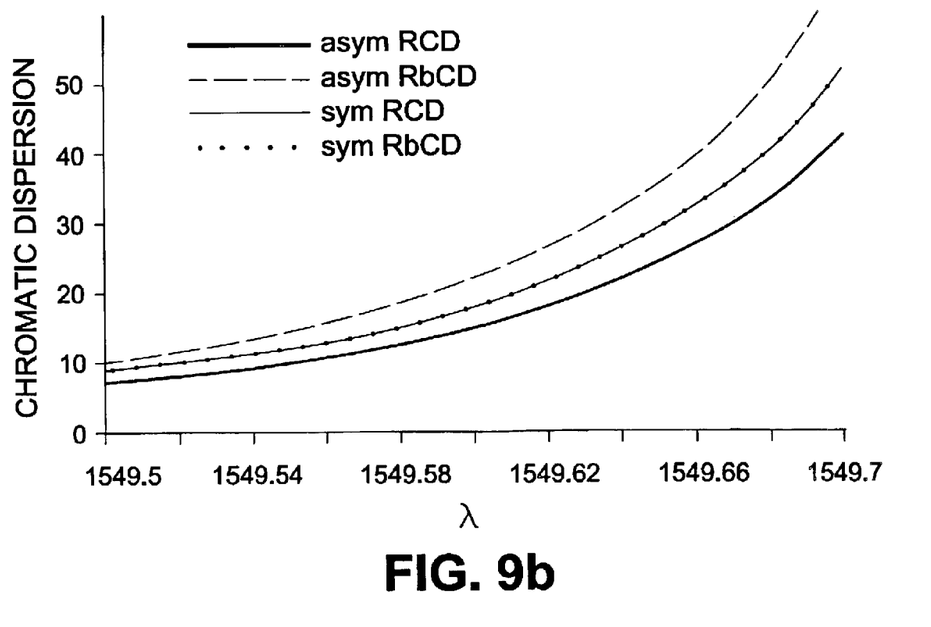
FIG. 9b illustrates the reflected chromatic dispersion exhibited by the filter shown in FIG. 8.

FIG. 9b illustrates the chromatic dispersion of light reflected from the left-hand side of the symmetric and asymmetric filters shown in FIG. 8, and in particular, shows the measured chromatic dispersion for the shorter wavelength light that was not permitted to pass through the bandpass filter. For the symmetric filter, the reflected chromatic dispersion (RCD) and the backside reflected chromatic dispersion (RbCD), the latter of which is reflected from the opposite side of the filter, are the same as shown by the overlapping central curves. For the asymmetric filter, the RCD shown by the solid lower line is significantly lower than the RbCD shown by the dotted upper line. For example, at 1549.5 the difference in reflected chromatic dispersion is about 3 ps/nm, while at 1549.65 nm the difference is greater than 10 ps/nm. This translates roughly into reflected dispersion that is 1.5 and 5 ps/nm lower, respectively, than the symmetric filter provides. Remarkably, this significant improvement is achieved with minimal loss (i.e., refer to FIG. 9a).

Advantageously, intentionally providing a known asymmetry into a multi-cavity filter structure, as for example, discussed in each of the above embodiments, produces a filter that exhibits significantly lower reflected chromatic dispersion from one side as compared to a symmetric filter structure, as described heretofore. Preferably, the low reflected dispersion resulting from the asymmetric filter structure is exploited by placing the filter where the signal with the low chromatic dispersion is further processed.

Figure 10:
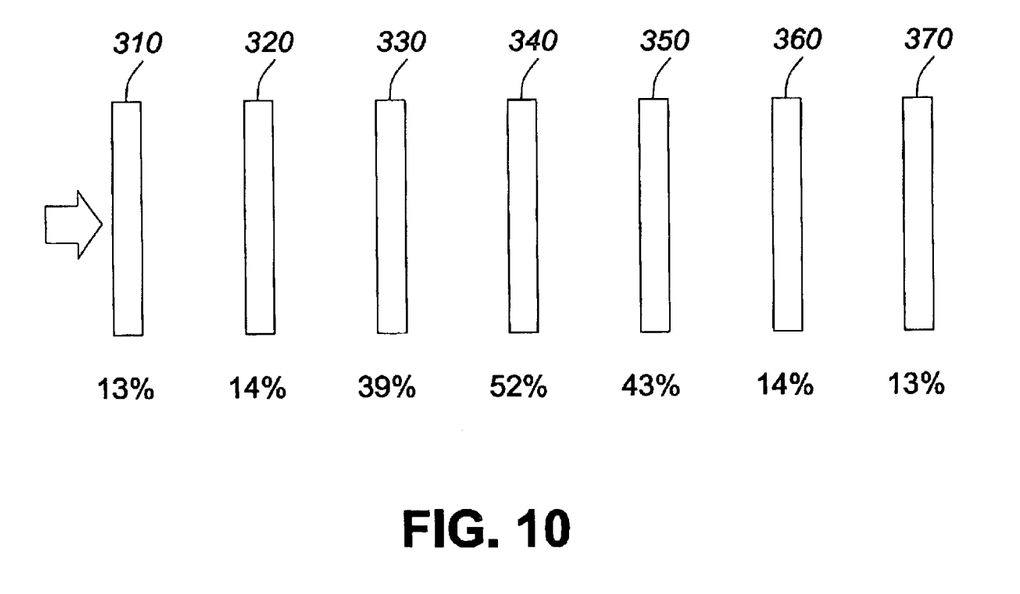
FIG. 10 is a schematic diagram of an interleaver in accordance with an embodiment of the instant invention.

Referring to FIG. 10, there is shown an interleaver having low dispersion in accordance with yet another embodiment of the instant invention. The interleaver 300 is a multi-cavity etalon having asymmetrically distributed reflective surfaces. The etalon is shown as a multi-cavity air-spaced etalon for simplicity, however, a multi-cavity solid etalon is also within the scope of the invention. The etalon includes first 310, second 320, third 330, fourth 340, fifth 340, sixth 360 and seventh 370 reflective films, each spaced apart from the other by a same predetermined distance related to the free spectral range (FSR) of the interleaver. For exemplary purposes, the reflective films 310, 320, 330, 340, 350, 360, and 370 are shown having reflectivities corresponding to 13%, 14%, 39%, 52%, 43%, 14%, 13% such that the reflectivities are asymmetrically distributed about the centre of the filter, while the air spaces about 1.5 mm. Accordingly, the filter structure is asymmetric and will exhibit a higher reflected chromatic dispersion from one side than from the other.

Of course, numerous other embodiments can be envisaged without departing from the spirit and scope of the invention. For example, the low chromatic dispersion multi-cavity filters are based on any one of various designs/types.

What is claimed is:

1. A multi-cavity optical bandpass filter for passing only a single passband comprising:
   a plurality of filter cavities, each cavity including two spaced apart partially reflective films, wherein each partially reflective film is substantially a quarter wave or integer quarter wave in thickness, each cavity also including a spacer layer that is substantially a half wave or an integer multiple of half waves in thickness between the spaced apart reflective films, wherein each cavity has a specific Q factor,
   wherein the plurality of filter cavities are disposed about a centre of the filter, such that at least two cavities are disposed on each side of the center of the filter and wherein at least one cavity on one side of the center of the filter has a Q factor different than an opposing cavity, on another side of the center of the filter, wherein the at least one cavity and the opposing cavity are each substantially a same distance from the centre of the filter, such that chromatic dispersion for light reflected from a first end of the filter is different from chromatic dispersion for light reflected from a second end of the filter.

2. A multi-cavity optical filter as defined in claim 1, wherein the Q factor of the at least one cavity is selected to reduce reflected chromatic dispersion of light incident on one side of the filter.

3. A multi-cavity optical filter as defined in claim 2, wherein the partially reflective films comprise quarter-wave reflecting stacks formed from layers of material of alternating high and low refractive index.

4. A multi-cavity optical filter as defined in claim 3, comprising a dielectric spacer disposed between the two partially reflective films, the dielectric spacer having a thickness that is an integral number of half-waves of a center wavelength of a band of wavelengths that is passed through the filter.

5. A multi-cavity optical filter as defined in claim 4, wherein the specific Q factors are predetermined by varying one of a reflectivity of the quarter-wave reflecting stacks and the thickness of the dielectric spacer.

6. A multi-cavity optical filter as defined in claim 5, wherein the reflectivity is predetermined by varying one of a refractive index ratio between the alternating high and low refractive index materials and a number of alternating pairs of high and low refractive index materials.

7. A multi-cavity optical filter as defined in claim 4, wherein at least one of a cavity having a highest Q-factor, a quarter-wave stack having a highest reflectivity, and a dielectric spacer having a largest thickness is disposed away from centre of the filter.

8. A multi-cavity optical filter as defined in claim 1, wherein each cavity has a cavity spacing that is an integral number of half-waves of a center wavelength of a band of wavelengths that is passed through the filter.

9. A multi-cavity optical filter as defined in claim 1, wherein a cavity having a highest Q-factor is disposed away from the centre of the filter.

10. A multi-cavity optical filter as defined in claim 1, wherein a partially reflective film having a highest reflectivity is disposed away from the centre of the filter.

11. A multi-cavity optical filter as defined in claim 1, wherein a cavity having a largest cavity spacing is disposed away from centre of the filter.

12. A multi-cavity optical filter as defined in claim 1, wherein the filter is designed such that the Q factors are asymmetrically distributed about the centre of the filter.

13. A multi-cavity optical filter as defined in claim 1, wherein the filter is a bandpass filter.

14. A multi-cavity bandpass optical filter comprising:
a plurality of filter cavities, each cavity including two spaced apart partially reflective films and having a specific Q factor,
wherein the plurality of cavities are disposed about a centre of the filter, and wherein at least one cavity has a Q factor different than an opposing cavity, the at least one cavity and the opposing cavity each substantially a same distance from the centre of the filter, wherein the Q factor of the at least one cavity is selected to reduce reflected chromatic dispersion of light incident on one side of the filter.

15. A multi-cavity optical filter bandpass filter for passing a single optical band of wavelengths having a predetermined centre wavelength, comprising:
at least four filter cavities, each cavity including two spaced apart partially reflective films and having a specific Q factor, wherein each cavity includes a spacer that is substantially half wave spacer layer or integer multiple thereof between the two spaced apart reflective films, wherein two of the at least four filter cavities are disposed on opposite sides of a center of the bandpass optical filter, and wherein the two filter cavities have different Q factors and are spaced a same number of cavities away from the center of the filter, the two cavities each having a spacer between the reflective films having optical thickness that is substantially an integer number of half waves of the center wavelength of the bandpass filter, and wherein the two spaced apart reflective films are substantially a quarter wave in optical thickness of the center wavelength, such that chromatic dispersion for light reflected from a first end of the filter is different from chromatic dispersion for light reflected from a second end of the filter.

* * * * *